United States Patent [19]

Parzefall

[11] Patent Number: 4,832,166

[45] Date of Patent: May 23, 1989

[54] FRICTION CLUTCH FOR MOTOR VEHICLES

[75] Inventor: Walter Parzefall, Bubenreuth, Fed. Rep. of Germany

[73] Assignee: INA Walzlager Schaeffler KG, Fed. Rep. of Germany

[21] Appl. No.: 152,955

[22] Filed: Feb. 5, 1988

[30] Foreign Application Priority Data

Feb. 25, 1987 [DE] Fed. Rep. of Germany ....... 3706031

[51] Int. Cl.⁴ .............................................. F16D 23/14
[52] U.S. Cl. .................................... 192/98; 192/70.13; 192/99 S; 192/110 B; 192/DIG. 1
[58] Field of Search ................... 192/98, 110 B, 70.13, 192/99 S, DIG. 1

[56] References Cited

U.S. PATENT DOCUMENTS 4,560,052 12/1985 Renand ................................ 192/98

FOREIGN PATENT DOCUMENTS 2193284 2/1988 United Kingdom ................. 192/98

Primary Examiner—Rodney H. Bonck
Assistant Examiner—Andrea Pitts
Attorney, Agent, or Firm—Bierman and Muserlian

[57] ABSTRACT

A friction clutch for a motor vehicle with a release bearing which is engaged by a clutch lever with an axially displaceable thrust ring connected in an axially locked manner with regard to pulling by locking elements spaced about its periphery with a rotatable inner ring of the release bearing, and with unlocking lugs corresponding with the locking elements and disengage the locking elements from the inner ring, characterized in that an unlocking slide (15) is guided for radial displacement between an idle position and an unlocking position on the clutch lever (3) and corresponds with the unlocking lugs (22) and the unlocking lugs (22) disengage the locking elements (12) from the inner ring (7) by the unlocking slide (15) which is shifted into the unlocking position.

10 Claims, 3 Drawing Sheets

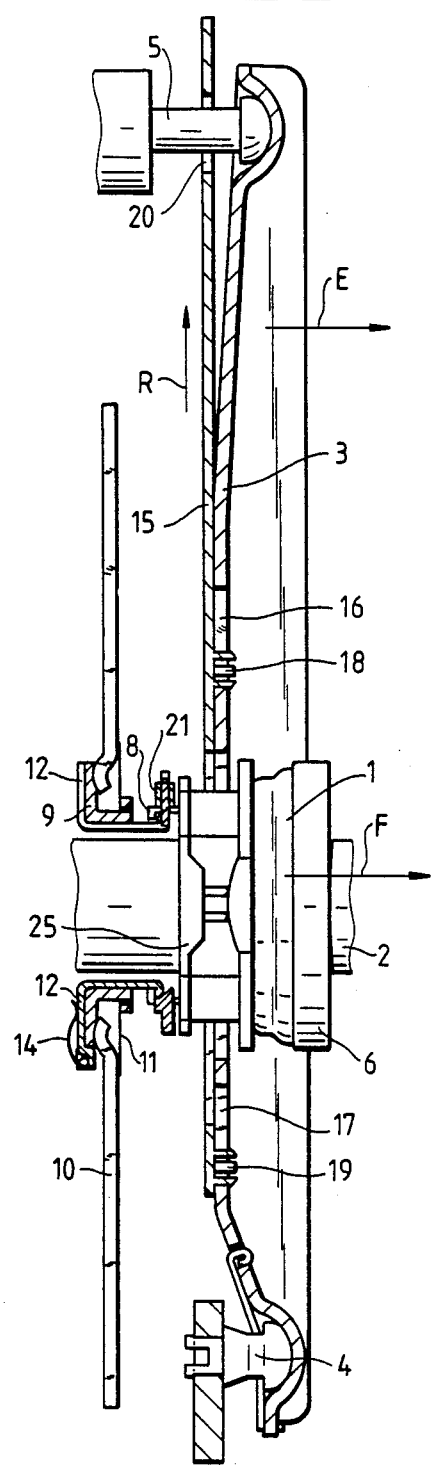

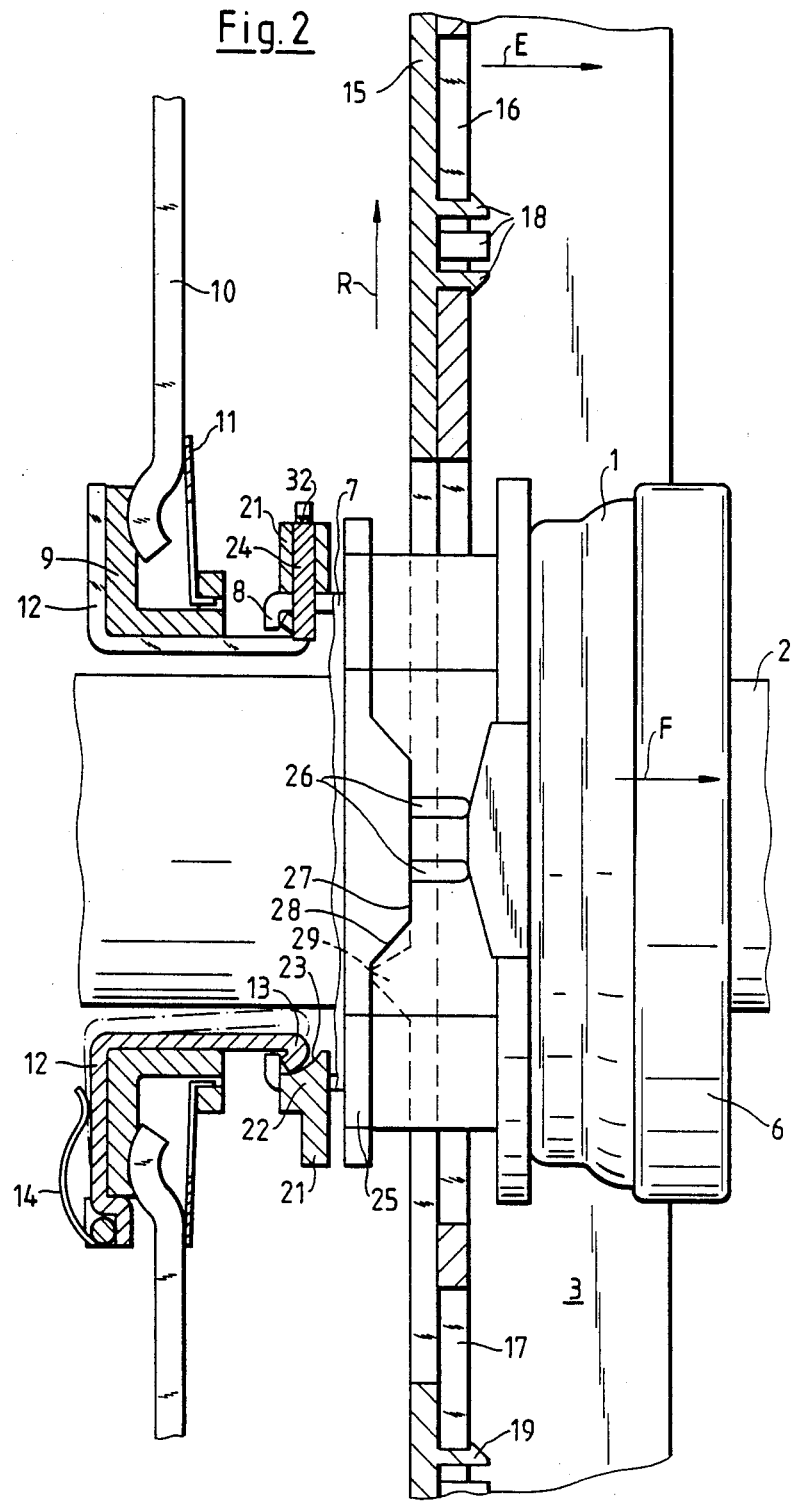

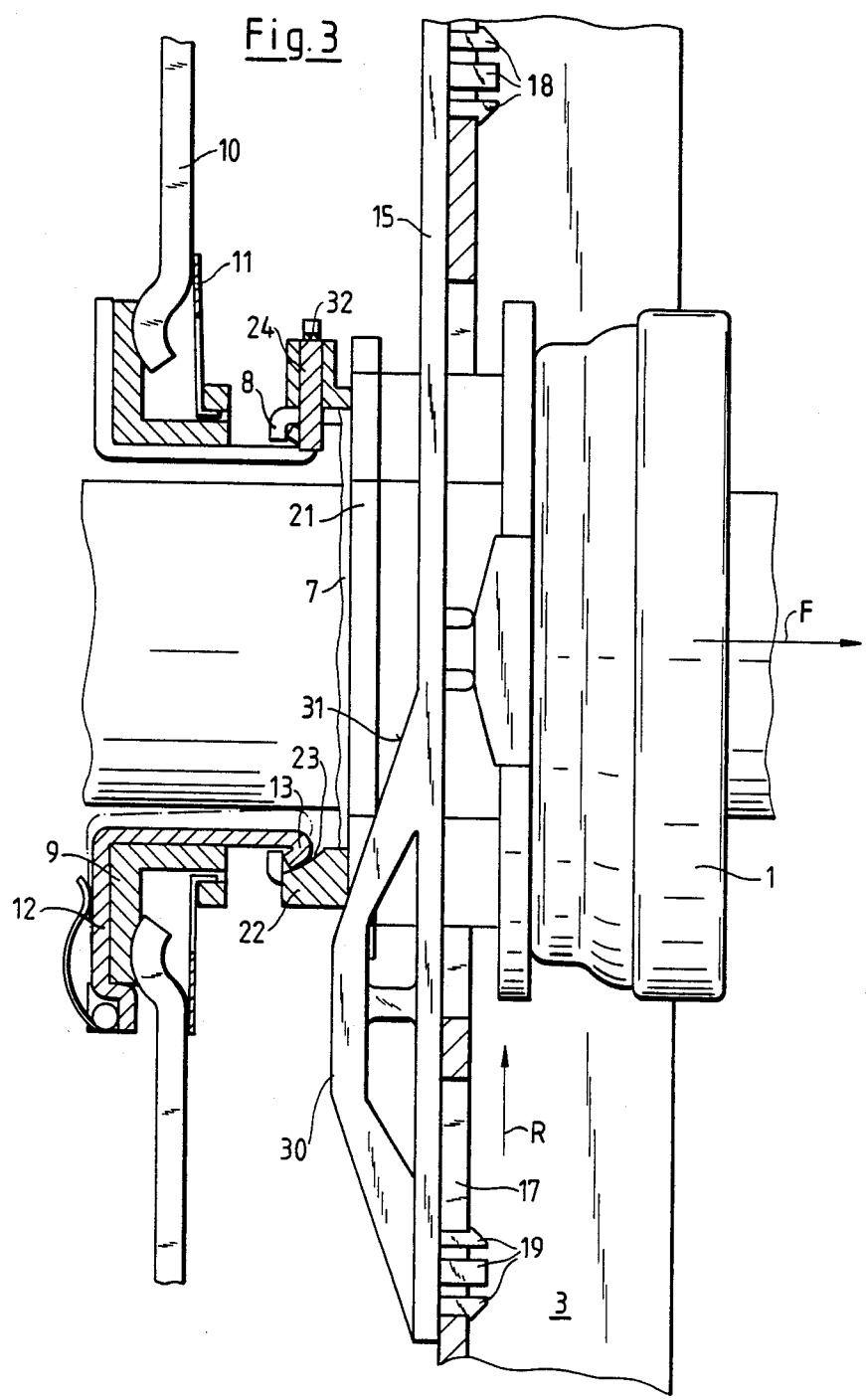

4,832,166

FRICTION CLUTCH FOR MOTOR VEHICLES

STATE OF THE ART

Friction clutch for motor vehicles with a release bearing which is engaged by a clutch lever with an axially displaceable thrust ring connected in an axially locked manner with regard to pulling by locking elements spaced about its periphery with a rotatable inner ring of the release bearing, and with unlocking lugs corresponding with the locking elements which during axial displacement disengage the locking elements from the inner ring are known. Such a friction clutch is described in DE-OS No. 3,150,150 in which tangential rollers are provided as locking elements between the thrust ring and the inner ring and are disposed in operational position partly in a groove of the inner ring and partly in a slot of the thrust ring to transmit in this manner the axial actuating force of the clutch. A further ring surrounds the thrust ring and is provided with unlocking lugs.

When displacing this ring, the unlocking lugs shift the rollers from the groove completely into the slot, thereby disengaging the inner ring of the release bearing from the thrust ring of the clutch. Then, dismantling is feasible, but the ring must be displaced against the force of a spring which force must be of sufficient magnitude to prevent the rollers from being disengaged from the groove of the inner ring upon the effect of a centrifugal force. Therefore, the required actuating force for the displacement of the ring is of comparable magnitude. Moreover, the ring for displacing the rollers must be retained in DE-OS No. 3,150,150 against the force of the spring during the mismantling until the groove of the inner ring is removed from under the rollers since otherwise the rollers would occupy their operational position. This renders the dismantling more difficult.

OBJECTS OF THE INVENTION

It is an object of the invention to design a friction clutch of the above-stated type which allows a disengagement of the locking elements from the inner ring during dismantling without any tool and without requiring a manual axial displacement of the unlocking lugs and a manual holding of the unlocking lugs in their unlocking position for the dismantling.

This and other objects and advantages of the invention will become obvious from the following detailed description.

THE INVENTION

The novel friction clutch of the invention for a motor vehicle with a release bearing which is engaged by a clutch lever with an axially displaceable thrust ring connected in an axially locked manner with regard to pulling by locking elements spaced about its periphery with a rotatable inner ring of the release bearing, and with unlocking lugs corresponding with the locking elements which during axial displacement disengage the locking elements from the inner ring, is characterized in that an unlocking slide (15) is guided for radial displacement between an idle position and an unlocking position on the clutch lever (3) and corresponds with the unlocking lugs (22) and the unlocking lugs (22) disengage the locking elements (12) from the inner ring (7) by the unlocking slide (15) which is shifted into the unlocking position.

In the unlocking position, the unlocking lugs are urged axially against the locking elements by manual, radial displacement of the unlocking slide so that the locking elements are kept disengaged from the inner ring. Dismantling is then possible in a simple manner. In the idle position, the unlocking slide is separated from the unlocking lugs which thus can rotate with the thrust ring and the inner ring, respectively.

It is also favorable that the unlocking lugs are not loaded by the actuating forces of the clutch. The forces required for actuation of the unlocking lugs are low because the unlocking requires only the actuation of the locking elements. Moreover, it is favorable that the path of displacement required for assembling and the motion required for the unlocking are independent of each other so that even greater tolerances do not impair a secure assembling and dismantling.

According to a preferred design of the invention, the unlocking lugs are arranged at a common axially displaceable unlocking ring and include slant surfaces facing the locking elements. Through the axial displacement of the unlocking rings, all unlocking lugs act simultaneously on the pertaining locking elements so that the latter are disengaged from the inner ring. Preferably, the unlocking ring is itself arranged for axial displacement at the inner ring but in a non-rotational manner whereby the unlocking ring is firmly retained at the inner ring.

REFERRING NOW TO THE DRAWINGS

FIG. 1 is a partial cross-sectional view of a motor vehicle clutch with a release bearing, FIG. 2 is a partial cross-sectional view on an enlarged scale of the embodiment of FIG. 1 and FIG. 3 is a partial cross-sectional view similar to FIG. 2 of another embodiment of a clutch of the invention.

In FIG. 1, the pull-type friction clutch of a motor vehicle includes a release bearing (1) which is guided for axial displacement on a guide pipe (2) arranged in a clutch bell. Connected to the release bearing (1) is a clutch lever (3) with one end supported by a support bolt (4) and with another end being acted upon by an actuating element (5) which can be represented by a hydraulic cylinder or a tackle. Rotatably supported in the housing (6) of the release bearing (1) is an inner ring (7), FIG. 2, provided with a radially inwardly directed collar (8) at its outer end.

Bearing against a thrust ring (9) of the clutch is a disc spring (10) which sits in a clutch disc not shown in detail and further disc spring (11) supports the thrust ring (9) at the inner circumference of the disc spring (10). Swingably mounted on the outer circumference of the thrust ring (9) are three angle segments (12) provided as locking elements and including hooks (13) in the area of the collar (8). The angle segments (12) are prestressed by springs (14).

During assembling of the release bearing (1) at the thrust ring (9), the collar (8) of the inner ring (7) slides over the hooks (13) which inwardly swing opposite to the force of the spring (14). When the collar (8) reaches over the hooks (13), then the latter latch behind the collar (8) to create a connection which is locked with regard to pulling between the inner ring (7) and the thrust ring (9). By swinging the clutch lever (3) in the direction of the arrow (E), the release bearing (1) shifts in the direction of arrow (F). Consequently, the collar (8) of the inner ring (7) pulls at the hooks (13) of the angle segments (12) so that the thrust ring (9), too, is shifted in the direction of the arrow (F) and the disc spring (10) follows this motion and thus separates the clutch discs.

Clutch lever (3) supports an unlocking slide (15) for radial displacement in the direction of arrow (R) and the unlocking slide (15) extends approximately parallel to the clutch lever (3). The clutch lever (3) is provided with oblong holes (16,17) in which the locking lugs (18,19) of the unlocking slide (15) are latched. The unlocking slide (15) is provided with an opening (20) through which the actuating element (5) projects. As long as the actuating element (5) projects through the opening (20), displacement of the unlocking slide (15) is prevented.

An unlocking ring (21) is placed over the inner ring (7) and provided with unlocking lugs (22). Each angle segment (12) and hook (13) corresponds with at least one unlocking lug (22) which traverse recesses of the inner ring (7) toward the inside and are provided with slant surfaces (23) facing the hooks (13). The unlocking ring (21) is axially movable relative to the inner ring (7) and to retain the unlocking ring (21) on the inner ring (7) in a non-rotational manner, the unlocking ring (21) is provided with bolts (24) which traverse the inner ring (7). Thus, the unlocking ring (21) is supported for axial displacement on the inner ring (7) in a non-rotational and secure manner.

In the embodiment of FIGS. 1 and 2, a push ring (25) is guided for axial displacement at the housing (6) of the release bearing (1) in a non-rotational manner. The push ring (25) is provided about its outer circumference with spaced latches (26) which engage in respective slots of the housing (6) and the push ring (25) is located between the unlocking ring (21) and the unlocking slide (15). The push ring (25) includes a step (27) with an inclined surface (28) and cooperates with a wedge-shaped projection (29) of the unlocking slide (15).

The mode of operation of the embodiment of FIGS. 1 and 2 during dismantling is as follows. After loosening the actuating element (5), the unlocking slide (15) is pulled in the direction of the arrow (R) into its unlocking position from its idle position as shown in FIGS. 1 and 2. The projection (29) slides along the inclined surface (28) so that the push ring (25) is moved opposite to the direction of arrow (F) and abuts the unlocking ring (21) which is displaced opposite to the direction of the arrow (F) so that the slant surfaces (23) of its unlocking lugs (22) run against the hooks (13) and swing the angle segments (12) against the force of the springs (14). When the projection (29) is positioned on the step (27), the hooks (13) are disengaged from the collar (8) of the inner ring (7) whereby the release bearing (1) may be removed from the thrust ring (9).

In the embodiment of FIG. 3, the push ring (25) is not provided and the unlocking slide (15) includes a ramp (30) with an inclined surface (31). The mode of operation according to FIG. 3 during dismantling is as follows. After having removed the actuating element (5), the unlocking slide (15) is shifted in the direction of the arrow (R). The inclined surface (31) of its ramp (30) displaces the unlocking ring (21) opposite to the direction of the arrow (F) so that the unlocking lugs (22) thereof cause a swinging of the angle segments (12) via its slant surfaces (23) until the hooks (13) are disengaged from the collar (8). To avoid the necessity of pre-assembling the unlocking ring (21) in its rotational position in alignment with the inner ring (7), the bolt (24) is slidable within the unlocking ring (21) and pressure-loaded by a spring (32). The bolt (24) then latches into the associated opening of the inner ring (7) under the action of the spring (32) during turning of the unlocking ring (21) relative to the inner ring (7).

Various modifications of the clutches of the invention may be made without departing from the spirit or scope thereof and it should be understood that the invention is intended to be limited only as defined in the appended claims.

What we claim is:

1. A friction clutch for a motor vehicle with a release bearing which is engaged by a clutch lever with an axially displaceable thrust ring connected in an axially locked manner with regard to pulling by locking elements spaced about its periphery with a rotatable inner ring of the release bearing, and with unlocking lugs associated with the locking elements and which during axial displacement disengage the locking elements from the inner ring, characterized in that an unlocking slide (15) is guided for radial displacement between an idle position and an unlocking position on the clutch lever (3) and corresponds with the unlocking lugs (22) and the unlocking lugs (22) disengage the locking elements (12) from the inner ring (7) by the unlocking slide (15) which is shifted into the unlocking position.

2. A friction clutch of claim 1 wherein the unlocking lugs (22) are arranged on a common axially displaceable unlocking ring (21) and include slant surfaces (23) facing the locking elements (12,13).

3. A friction clutch of claim 2 wherein the unlocking ring (21) is guided for axial displacement at the inner ring (7) in a non-rotational manner.

4. A friction clutch of claim 2 wherein the unlocking ring (21) surrounds the inner ring (7), the inner ring (7) includes an inwardly directed collar (8) and the locking elements (12) are swingably mounted on the thrust ring (9) and engage behind the collar (8) with hooks (13) which face the slant surfaces (23) of the unlocking lugs (22) so that the unlocking lugs (22) disengage the hooks (13) from the collar (8) in the unlocking position.

5. A friction clutch of claim 3 wherein the unlocking ring (21) surrounds the inner ring (7), the inner ring (7) includes an inwardly directed collar (8) and the locking elements (12) are swingably mounted on the thrust ring (9) and engage behind the collar (8) with hooks (13) which face the slant surfaces (23) of the unlocking lugs (22) so that the unlocking lugs (22) disengage the hooks (13) from the collar (8) in the unlocking position.

6. A friction clutch of claim 1 wherein the unlocking slide (15) includes a ramp (30) which holds the axially displaced unlocking ring (21) in the unlocking position.

7. A friction clutch of claim 2 wherein between the unlocking ring (21) and the unlocking slide (15) an axially displaceable push ring (25) is arranged which is supported in a non-rotational manner on the release bearing (1) and is axially displaced in the unlocking position by the unlocking slide (15) and retains the axially displaced unlocking ring (21).

8. A friction clutch of claim 7 wherein the push ring (25) includes a step (27) with an inclined surface (28) which is associated with a wedge-shaped projection (29) of the unlocking slide (15).

9. A friction clutch of claim 1 wherein the unlocking slide (15) is slidably supported by locking hooks (18,19) in oblong holes (16,17) of the clutch lever (3) to provide a locking connection.

10. A friction clutch of claim 1 wherein the unlocking slide (15) is secured in its idle position by an actuating element (5) of the clutch lever (3).

* * * * *